US008286008B2

(12) United States Patent
Peng et al.

(10) Patent No.: US 8,286,008 B2
(45) Date of Patent: Oct. 9, 2012

(54) MULTI-PHASE VOLTAGE REGULATOR ON MOTHERBOARD

(75) Inventors: Chih-Yung Peng, Taipei (TW); Chih-Wang Hsu, Taipei (TW); Nung-Te Huang, Taipei (TW); Yii-Lin Wu, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 601 days.

(21) Appl. No.: 12/429,960

(22) Filed: Apr. 24, 2009

(65) Prior Publication Data

US 2009/0276641 A1 Nov. 5, 2009

(30) Foreign Application Priority Data

Apr. 30, 2008 (TW) .............................. 97115933 A (51) Int. Cl.
*G06F 1/26* (2006.01)
(52) U.S. Cl. ........................... 713/300; 713/340
(58) Field of Classification Search .................. 713/300, 713/310, 340; 323/212, 213
See application file for complete search history.

(56) References Cited

U.S. PATENT DOCUMENTS

| 5,515,257 | A | 5/1996 | Ishii |
| 5,689,170 | A | 11/1997 | Ishikawa |
| 6,362,607 | B1 | 3/2002 | Wickersham et al. |
| 7,570,036 | B2 * | 8/2009 | Tang et al. ............... 323/283 |
| 2003/0218893 | A1 * | 11/2003 | Tai et al. ..................... 363/65 |
| 2005/0088156 | A1 | 4/2005 | Cheung |
| 2006/0209579 | A1 * | 9/2006 | Duerbaum et al. ......... 363/65 |

FOREIGN PATENT DOCUMENTS

JP 8205563 8/1996

* cited by examiner

*Primary Examiner* — Paul Yanchus, III
(74) *Attorney, Agent, or Firm* — Jianq Chyun IP Office (57) ABSTRACT

A multi-phase voltage regulator includes a pulse width modulation control unit, a pulse signal extension circuit, M counts of current providing paths, and a feedback signal switching circuit. The pulse width modulation control unit generates N counts of pulse signals in a first cycle period. The pulse signal extension circuit receives the N counts of pulse signals in a second cycle period and divides the N counts of pulse signals into M counts of pulse signals, wherein $M=N\times 2^K$, K is a positive integer, and the second cycle period is $2^K$ times the first cycle period. The M counts of current providing paths generate corresponding M counts of sensing voltages. The feedback signal switching circuit receives the M counts of sensing voltages, successively switches the M counts of sensing voltages into N counts of sensing voltages, and transmits the N counts of sensing voltages to the pulse width modulation control unit.

15 Claims, 10 Drawing Sheets

MULTI-PHASE VOLTAGE REGULATOR ON MOTHERBOARD

FIELD OF THE INVENTION

The present invention relates to a voltage regulator on a motherboard, and more particularly to a multi-phase voltage regulator on a motherboard.

BACKGROUND OF THE INVENTION

Generally, a computer system includes a power supply apparatus for providing stable DC voltages, e.g. 12V or 5V, required to power specified hardware components of the computer system. Since the magnitude of the CPU core voltage is different from the DC voltages offered by the power supply apparatus, an additional voltage regulator (VR) is provided on the motherboard. By the voltage regulator, a relatively higher DC voltage (e.g. 12V) is decreased to the CPU core voltage (e.g. 1.3V). Such a voltage regulator is also referred as a buck DC/DC converter.

Figure 1:
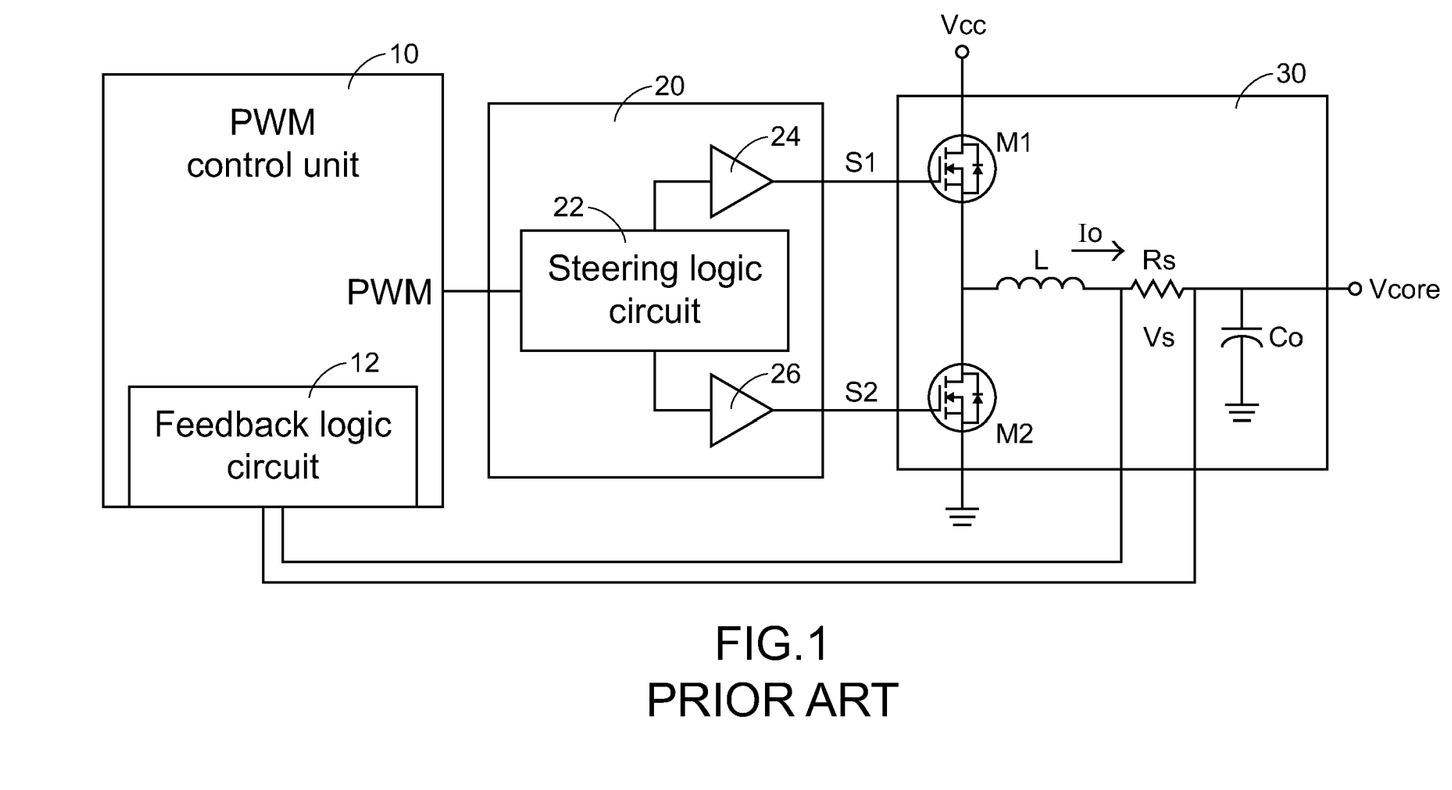
FIG. 1 is a schematic circuit diagram illustrating a single-phase voltage regulator mounted on a motherboard according to the prior art.

FIG. 1 is a schematic circuit diagram illustrating a single-phase voltage regulator mounted on a motherboard according to the prior art. The single-phase voltage regulator principally comprises a PWM (pulse width modulation) control unit 10, a driver unit 20 and a power stage circuit 30. The PWM control unit 10 can issue a PWM (pulse width modulation) signal to the driver unit 20.

The driver unit 20 comprises a steering logic circuit 22 and two driving circuits 24 and 26. In response to the PWM signal, the steering logic circuit 22 issues a first steering signal and a second steering signal to the driving circuits 24 and 26, respectively. When the first steering signal and the second steering signal are received, the driving circuits 24 and 26 generate a first driving signal S1 and a second driving signal S2, respectively.

The power stage circuit 30 comprises an upper power FET (field effect transistor) M1, a lower power FET M2, an output inductor L, a current sense resistor Rs and an output capacitor Co. The drain electrode (D) of the upper power FET M1 is connected to a supply voltage Vcc. The gate electrode (G) of the upper power FET M1 is connected to the driving circuit 24 for receiving the first driving signal S1. The source electrode (S) of the upper power FET M1 is connected to a first terminal of the output inductor L. The drain electrode (D) of the lower power FET M2 is connected to the first terminal of the output inductor L. The gate electrode (G) of the lower power FET M2 is connected to the driving circuit 26 for receiving the second driving signal S2. The source electrode (S) of the lower power FET M2 is connected to the ground terminal (GND). The current sense resistor Rs is interconnected between a second terminal of the output inductor L and the output terminal Vcore of the CPU core voltage. The output capacitor Co is interconnected between the output terminal Vcore of the CPU core voltage and the ground terminal (GND).

In addition, the output terminal Vcore of the CPU core voltage is connected to a power layer (not shown) of the motherboard. The power layer is also connected to a central processing unit (CPU) for offering a desired CPU core voltage to the CPU. The upper power FET M1 and the lower power FET M2 are N-type MOSFETs. The supply voltage Vcc is 12V.

In response to the first driving signal S1 and the second driving signal S2, the power FETs M1 and M2 are conducted such that an output current Io flows to the CPU through the output inductor L and the current sense resistor Rs. According to the magnitude of the output current Io, it is realized whether the CPU is operated at a heavy load or at a light load. Moreover, a feedback logic circuit 12 of the PWM control unit 10 are connected to both ends of the current sense resistor Rs to detect the potential difference across the both ends of the current sense resistor Rs. The potential difference across the both ends of the current sense resistor Rs is also referred as a sensing voltage Vs. In a case that the CPU is operated at a heavy load, the feedback logic circuit 12 of the PWM control unit 10 will increase the pulse width of the PWM signal according to the sensing voltage Vs, thereby increasing the output current Io. Whereas, in another case that the CPU is operated at a light load, the feedback logic circuit 12 of the PWM control unit 10 will decrease the pulse width of the PWM signal according to the sensing voltage Vs, thereby reducing the output current Io.

Recently, as the operating frequency of the CPU is gradually increased, the watts of the power required for operating the CPU need to be correspondingly increased. Under this circumstance, the conventional single-phase voltage regulator fails to provide sufficient output current to the CPU. For solving this problem, a multi-phase voltage regulator is provided on the motherboard to offer desired output current to the CPU.

Figure 2A:
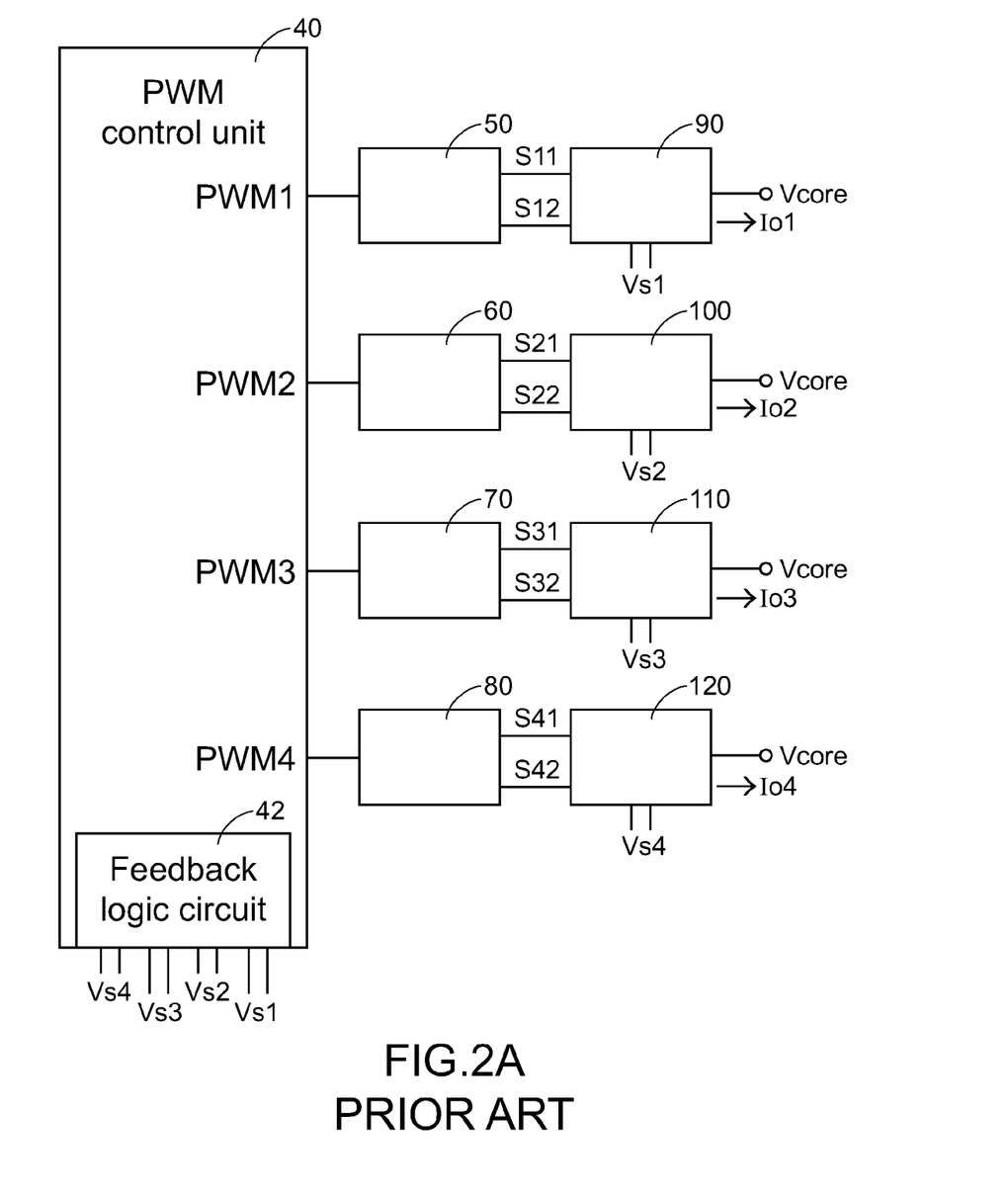
FIG. 2A is a schematic circuit block diagram illustrating a four-phase voltage regulator mounted on a motherboard according to the prior art.

FIG. 2A is a schematic circuit block diagram illustrating a four-phase voltage regulator mounted on a motherboard according to the prior art. As shown in FIG. 2A, the four-phase voltage regulator principally comprises a PWM (pulse width modulation) control unit 40, a first driver unit 50, a second driver unit 60, a third driver unit 70, a fourth driver unit 80, a first power stage circuit 90, a second power stage circuit 100, a third power stage circuit 110 and a fourth power stage circuit 120. The PWM control unit 40 can issue four pulse signals PWM1, PWM2, PWM3 and PWM4 to the first driver unit 50, the second driver unit 60, the third driver unit 70 and the fourth driver unit 80, respectively. The first driver unit 50 is connected to the first power stage circuit 90. The second driver unit 60 is connected to the second power stage circuit 100. The third driver unit 70 is connected to the third power stage circuit 110. The fourth driver unit 80 is connected to the fourth power stage circuit 120. In addition, the output terminals Vcore of the CPU core voltages that are outputted from the four power stage circuit 90, 100, 110 and 120 are all connected to a power layer (not shown) of the motherboard. The power layer is also connected to the CPU for offering a desired CPU core voltage to the CPU. In other words, the output current to be transmitted to the CPU is offered by the four-phase voltage regulator according to the four pulse signals PWM1, PWM2, PWM3 and PWM4. The configurations and the operating principles of the driver units 50, 60, 70 and 80 are identical to those of the driver unit 20 shown in FIG. 1, and are not redundantly described herein. The configurations and the operating principles of the power stage circuits 90, 100, 110 and 120 are identical to those of the power stage circuit shown in FIG. 1, and are not redundantly described herein.

When the first pulse signal PWM1 is received by the first driver unit 50, the first driver unit 50 issues a first driving signal S11 and a second driving signal S12 to the first power stage circuit 90. In response to the first driving signal S11 and the second driving signal S12, the first power stage circuit 90 generates a first output current Io1. In addition, a first sensing voltage Vs1 is transmitted from the first power stage circuit 90 to the feedback logic circuit 42 of the PWM control unit 40 to adjust the pulse width of the first pulse signal PWM1 as well as the magnitude of the first output current Io1. When the second pulse signal PWM2 is received by the second driver unit 60, the second driver unit 60 issues a first driving signal S21 and a second driving signal S22 to the second power stage circuit 100. In response to the first driving signal S21 and the second driving signal S22, the second power stage circuit 100 generates a second output current Io2. In addition, a second sensing voltage Vs2 is transmitted from the second power stage circuit 100 to the feedback logic circuit 42 of the PWM control unit 40 to adjust the pulse width of the second pulse signal PWM2 as well as the magnitude of the second output current Io2.

When the third pulse signal PWM3 is received by the third driver unit 70, the third driver unit 70 issues a first driving signal S31 and a second driving signal S32 to the third power stage circuit 110. In response to the first driving signal S31 and the second driving signal S32, the third power stage circuit 110 generates a third output current Io3. In addition, a third sensing voltage Vs3 is transmitted from the third power stage circuit 110 to the feedback logic circuit 42 of the PWM control unit 40 to adjust the pulse width of the third pulse signal PWM3 as well as the magnitude of the third output current Io3. When the fourth pulse signal PWM4 is received by the fourth driver unit 80, the third driver unit 80 issues a first driving signal S41 and a second driving signal S42 to the fourth power stage circuit 120. In response to the first driving signal S41 and the second driving signal S42, the fourth power stage circuit 120 generates a fourth output current Io4. In addition, a fourth sensing voltage Vs4 is transmitted from the fourth power stage circuit 120 to the feedback logic circuit 42 of the PWM control unit 40 to adjust the pulse width of the fourth pulse signal PWM4 as well as the magnitude of the fourth output current Io4.

Figure 2B:
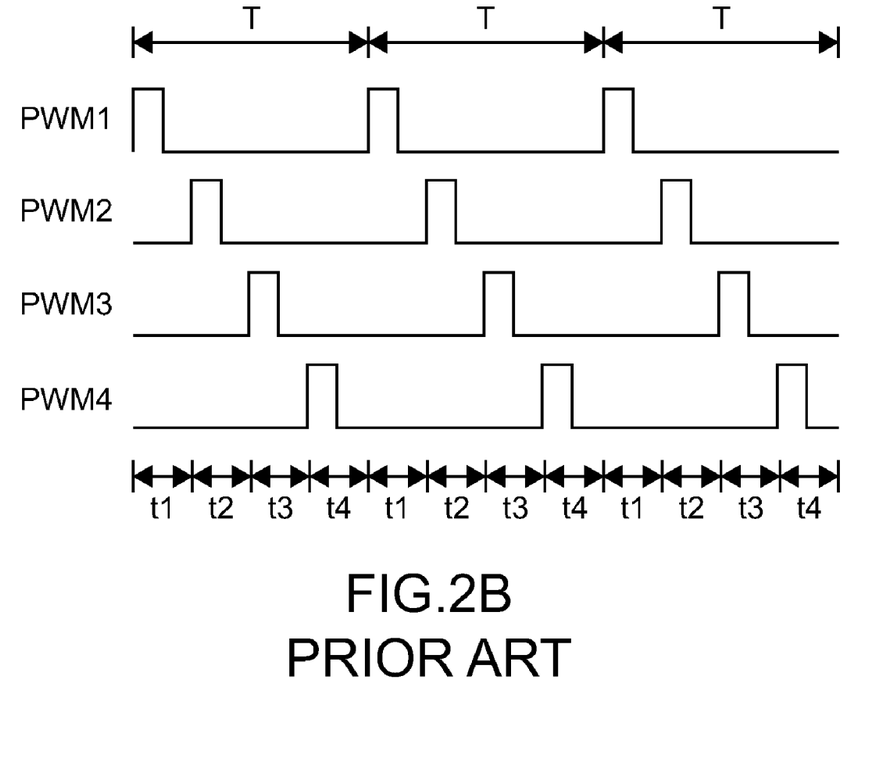
FIG. 2B is a schematic timing waveform diagram illustrating related signals processed in the four-phase voltage regulator shown in FIG. 2A.

FIG. 2B is a schematic timing waveform diagram illustrating related signals processed in the four-phase voltage regulator shown in FIG. 2A. The PWM control unit 40 successively issues the first pulse signal PWM1, the second pulse signal PWM2, the third pulse signal PWM3 and the fourth pulse signal PWM4 in a cycle period T. In addition, each cycle period T may be evenly divided into four time segments including a first time segment t1, a second time segment t2, a third time segment t3 and a fourth time segment t4. As shown in FIG. 2B, during the first time segment t1, the first pulse signal PWM1 is at a high-level state and thus the first sensing voltage Vs1 is employed to adjust the pulse width of the first pulse signal PWM1. Likewise, during the second time segment t2, the second pulse signal PWM2 is at a high-level state and thus the second sensing voltage Vs2 is employed to adjust the pulse width of the second pulse signal PWM2. Likewise, during the third time segment t3, the third pulse signal PWM3 is at a high-level state and thus the third sensing voltage Vs3 is employed to adjust the pulse width of the third pulse signal PWM3. Likewise, during the fourth time segment t4, the fourth pulse signal PWM4 is at a high-level state and thus the fourth sensing voltage Vs4 is employed to adjust the pulse width of the fourth pulse signal PWM4.

Since the phase number of the multi-phase voltage regulator has been previously determined according to the manufacturers' design, the PWM control unit 40 can provide a fixed number of pulse signals. Recently, for enhancing the performance of a computer system, the hobby user may implement an overclocking function or an overvolting function to operate the CPU at its optimal performance. In a case that the overclocking or overvolting function is implemented at a fixed phase number of the multi-phase voltage regulator, some drawbacks possibly occur. The drawbacks include for example the reduced efficiency of the multi-phase voltage regulator, the generation of much heat, burning of the power FETs and/or the breakdown of the output capacitors.

SUMMARY OF THE INVENTION

The present invention relates to a multi-phase voltage regulator that is mounted on a motherboard. The phase number of the multi-phase voltage regulator is larger than the number of pulse signals generated by the PWM control unit. As the phase number of the multi-phase voltage regulator is increased, the ripple current is reduced, the output current flowing through each current providing path is reduced but the operating efficiency is increased.

In accordance with an aspect of the present invention, there is provided a multi-phase voltage regulator. The multi-phase voltage regulator includes a pulse width modulation control unit, a pulse signal extension circuit, M counts of current providing paths, and a feedback signal switching circuit. The pulse width modulation control unit generates N counts of pulse signals in a first cycle period. The pulse signal extension circuit is used for receiving the N counts of pulse signals in a second cycle period and dividing the N counts of pulse signals into M counts of pulse signals, wherein $M=N\times 2^K$, K is a positive integer, and the second cycle period is $2^K$ times the first cycle period. The M counts of current providing paths generate corresponding M counts of sensing voltages in response to the M counts of pulse signals from the pulse signal extension circuit. The feedback signal switching circuit is used for receiving the M counts of sensing voltages, successively switching the M counts of sensing voltages into N counts of sensing voltages, and transmitting the N counts of sensing voltages to the pulse width modulation control unit.

In accordance with another aspect of the present invention, there is provided a motherboard. The motherboard includes a pulse width modulation control unit, a pulse signal extension circuit, M counts of current providing paths, a feedback signal switching circuit, a power layer and a central processing unit. The pulse width modulation control unit generates N counts of pulse signals. The pulse signal extension circuit is used for receiving the N counts of pulse signals and dividing the N counts of pulse signals into M counts of pulse signals, wherein M and N are different. The M counts of current providing paths are used for generating corresponding M counts of output currents and corresponding M counts of sensing voltages in response to the M counts of pulse signals from the pulse signal extension circuit. The feedback signal switching circuit is used for successively switching the M counts of sensing voltages into N counts of sensing voltages. The power layer is connected to the M counts of current providing paths for receiving the M counts of output currents, thereby providing a core voltage. The central processing unit receives the core voltage.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
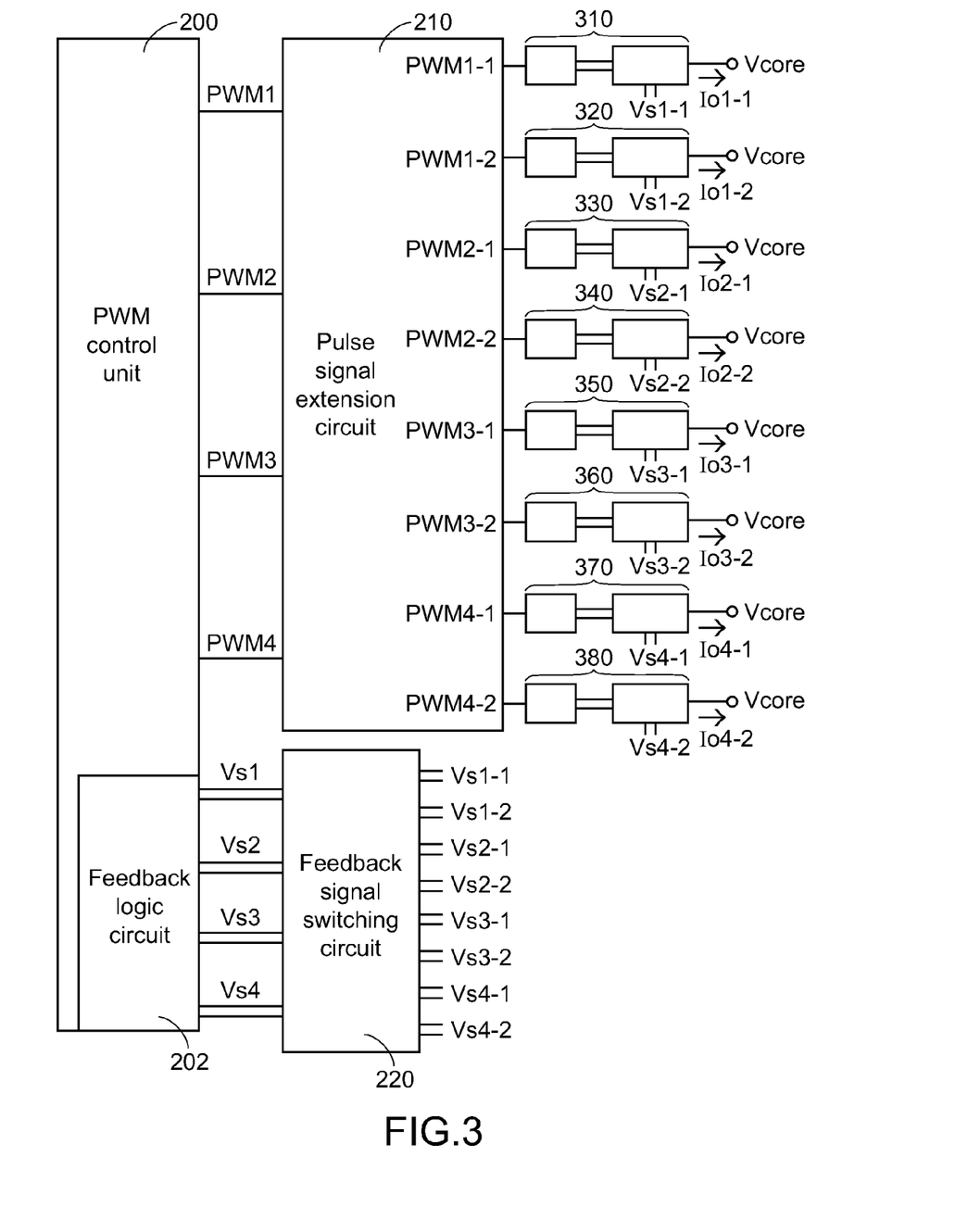
FIG. 3 is a schematic circuit block diagram illustrating a multi-phase voltage regulator mounted on a motherboard according to a preferred embodiment of the present invention.

FIG. 3 is a schematic circuit block diagram illustrating a multi-phase voltage regulator mounted on a motherboard according to a preferred embodiment of the present invention. The multi-phase voltage regulator principally comprises a PWM control unit 200, a pulse signal extension circuit 210, a feedback signal switching circuit 220, and several current providing paths 310~380. The pulse signal extension circuit 210 is interconnected between the PWM control unit 200 and the current providing paths 310~380. In accordance with a key feature of the present invention, if the PWM control unit 200 can issue N counts of the pulse signals, the pulse signal extension circuit 210 can generate M counts of pulse signals, wherein $M=N\times 2^K$, and K is a positive integer.

In this embodiment, the PWM control unit 200 can issue four pulse signals (N=4), and the pulse signal extension circuit 210 can generate eight of pulse signals (M=8), in which K=1. Under this circumstance, the multi-phase voltage regulator comprises eight current providing paths 310~380 and thus multi-phase voltage regulator may be referred as an eight-phase voltage regulator.

Please refer to FIG. 3 again. The output terminals of the eight current providing paths 310~380 are connected to a power layer (not shown) of the motherboard. The power layer is also connected to a central processing unit (CPU) for offering a desired CPU core voltage to the CPU. As shown in FIG. 3, the PWM control unit 200 can issue four pulse signals PWM1, PWM2, PWM3 and PWM4. After these four pulse signals are received, the pulse signal extension circuit 210 generates the eight phase pulse signals PWM1-1, PWM1-2, PWM2-1, PWM2-2, PWM3-1, PWM3-2, PWM4-1 and PWM4-2. In response to the eight pulse signals PWM1-1, PWM1-2, PWM2-1, PWM2-2, PWM3-1, PWM3-2, PWM4-1 and PWM4-2, the eight-phase voltage regulator offers the output currents Io1-1, Io1-2, Io2-1, Io2-2, Io3-1, Io3-2, Io1-4 and Io4-2 to the CPU through the current providing paths 310~380, respectively.

Moreover, the eight current providing paths 310~380 can respectively generate eight sensing voltages Vs1-1, Vs1-2, Vs2-1, Vs2-2, Vs3-1, Vs3-2, Vs4-1 and Vs4-2. Since the feedback logic circuit 202 of the PWM control unit 200 is capable of receiving only four sensing voltages Vs1, Vs2, Vs3 and Vs4, the feedback signal switching circuit 220 is used for switching the eight sensing voltages Vs1-1, Vs1-2, Vs2-1, Vs2-2, Vs3-1, Vs3-2, Vs4-1 and Vs4-2 into the four sensing voltages Vs1, Vs2, Vs3 and Vs4 during specified time segments.

Figure 4A:
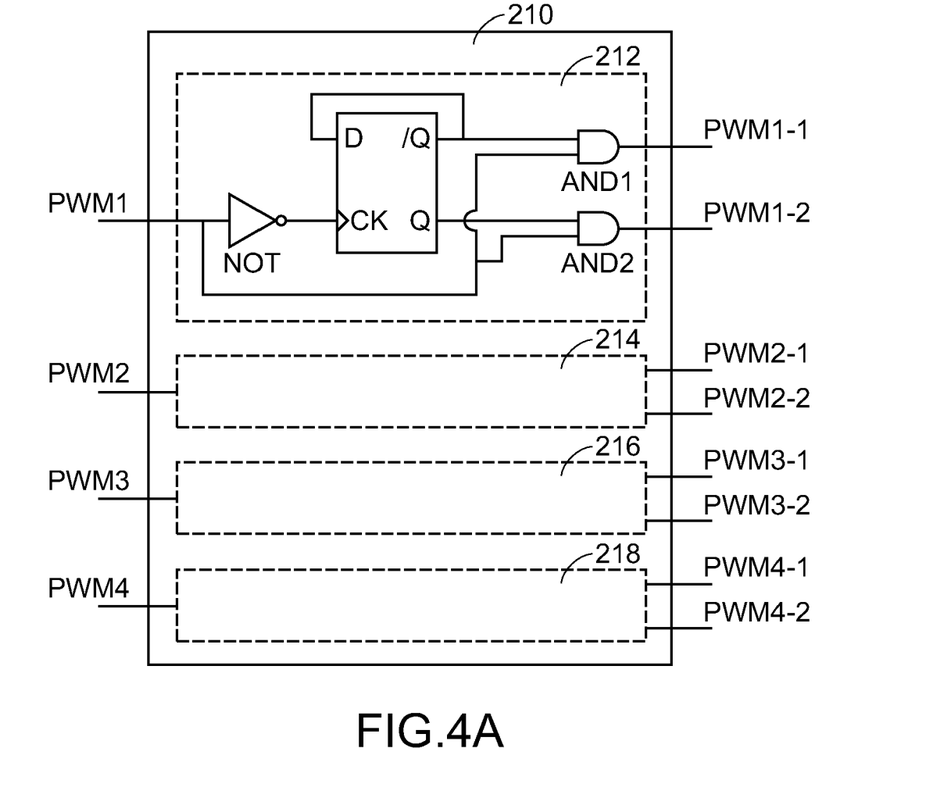
FIG. 4A is a schematic circuit block diagram illustrating an exemplary pulse signal extension circuit of the multi-phase voltage regulator shown in FIG. 3.

FIG. 4A is a schematic circuit block diagram illustrating an exemplary pulse signal extension circuit of the multi-phase voltage regulator shown in FIG. 3. The pulse signal extension circuit 210 has four sets of extension units 212, 214, 216 and 218. Since these extension units 212, 214, 216 and 218 have identical configurations, only the detailed circuitry of the first extension unit 212 is illustrated for brevity. As shown in FIG. 4A, the first extension unit 212 comprises a NOT gate (NOT), a D flip flop, a first AND gate (AND1), and a second AND gate (AND2). The NOT gate has an input terminal receiving the first pulse signal PWM1. The output terminal of the NOT gate is connected to the clock input terminal CK of the D flip flop. The data input terminal (D) and the inverse output terminal (/Q) of the D flip flop are connected with each other such that the D flip flop is formed as a frequency divider. The first AND gate has a first input terminal connected to the inverse output terminal (/Q) of the D flip flop and a second input terminal receiving the first pulse signal PWM1, so that the first AND gate outputs the pulse signal PWM1-1. The second AND gate has a first input terminal connected to the positive output terminal (Q) of the D flip flop and a second input terminal receiving the first pulse signal PWM1, so that the second AND gate outputs the pulse signal PWM1-2.

Figure 4B:
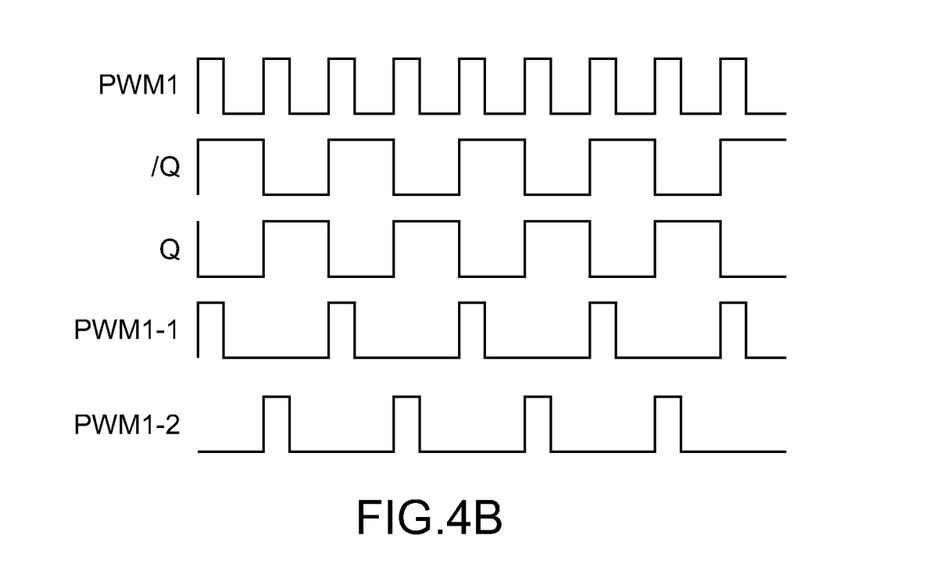
FIG. 4B is a schematic timing waveform diagram illustrating related signals processed in the first extension unit of the pulse signal extension circuit shown in FIG. 4A.

FIG. 4B is a schematic timing waveform diagram illustrating related signals processed in the first extension unit of the pulse signal extension circuit shown in FIG. 4A. As shown in FIG. 4B, the first pulse signal PWM1 is divided into two pulse signals PWM1-1 and PWM1-2 by the first extension unit 212. The rest may be deduced by analogy. In other words, the four pulse signals PWM1, PWM2, PWM3 and PWM4 can be divided into the eight pulse signals PWM1-1, PWM1-2, PWM2-1, PWM2-2, PWM3-1, PWM3-2, PWM4-1 and PWM4-2 by the pulse signal extension circuit 210.

Figure 5:
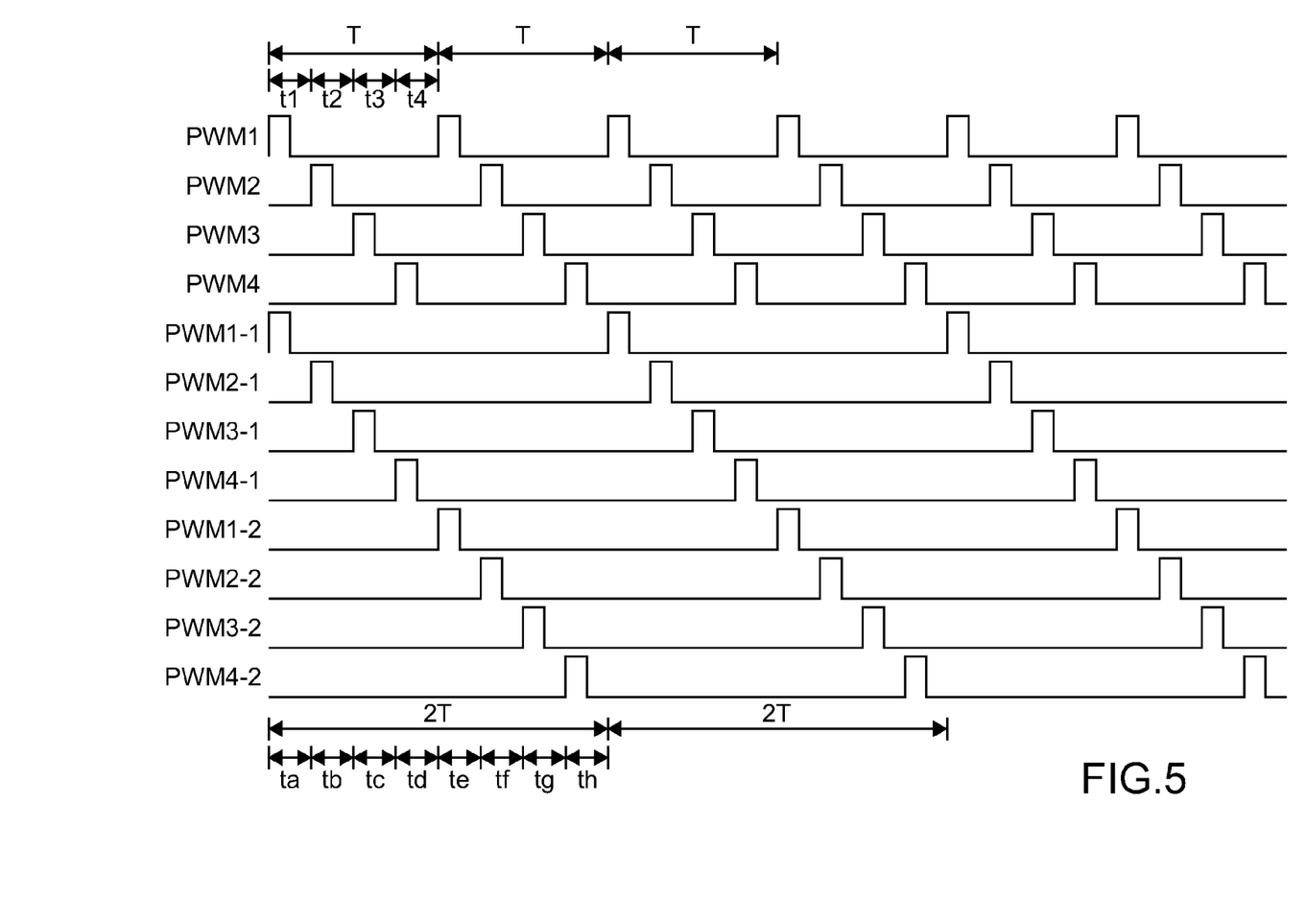
FIG. 5 is a schematic timing waveform diagram illustrating related pulse signals processed in the eight-phase voltage regulator shown in FIG. 3.

FIG. 5 is a schematic timing waveform diagram illustrating related pulse signals processed in the eight-phase voltage regulator shown in FIG. 3. The PWM control unit 200 successively issues the first pulse signal PWM1, the second pulse signal PWM2, the third pulse signal PWM3 and the fourth pulse signal PWM4 in a cycle period of T. In addition, the pulse signal extension circuit 210 successively generates the eight pulse signals PWM1-1, PWM1-2, PWM2-1, PWM2-2, PWM3-1, PWM3-2, PWM4-1 and PWM4-2 in a cycle period of 2T (or $2^K T$, wherein K=1). That is, the each cycle period 2T may be evenly divided into eight time segments including a first time segment ta, a second time segment tb, a third time segment tc, a fourth time segment td, a fifth time segment te, a sixth time segment tf, a seventh time segment tg, and an eighth time segment th.

As shown in FIG. 5, during the first time segment ta, the pulse signal PWM1-1 is at a high-level state and thus the sensing voltage Vs1-1 is employed to adjust the pulse width of the pulse signal PWM1-1. Likewise, during the second time segment tb, the pulse signal PWM2-1 is at a high-level state and thus the sensing voltage Vs2-1 is employed to adjust the pulse width of the pulse signal PWM2-1. Likewise, during the third time segment tc, the pulse signal PWM3-1 is at a high-level state and thus the sensing voltage Vs3-1 is employed to adjust the pulse width of the pulse signal PWM3-1. Likewise, during the fourth time segment td, the pulse signal PWM4-1 is at a high-level state and thus the sensing voltage Vs4-1 is employed to adjust the pulse width of the pulse signal PWM4-1. Likewise, during the fifth time segment te, the pulse signal PWM1-2 is at a high-level state and thus the sensing voltage Vs1-2 is employed to adjust the pulse width of the pulse signal PWM1-2. Likewise, during the sixth time segment tf, the pulse signal PWM2-2 is at a high-level state and thus the sensing voltage Vs2-2 is employed to adjust the pulse width of the pulse signal PWM2-2. Likewise, during the seventh time segment tg, the pulse signal PWM3-2 is at a high-level state and thus the sensing voltage Vs3-2 is employed to adjust the pulse width of the pulse signal PWM3-2. Likewise, during the eighth time segment th, the pulse signal PWM43-2 is at a high-level state and thus the sensing voltage Vs4-2 is employed to adjust the pulse width of the pulse signal PWM4-2.

Figure 6:
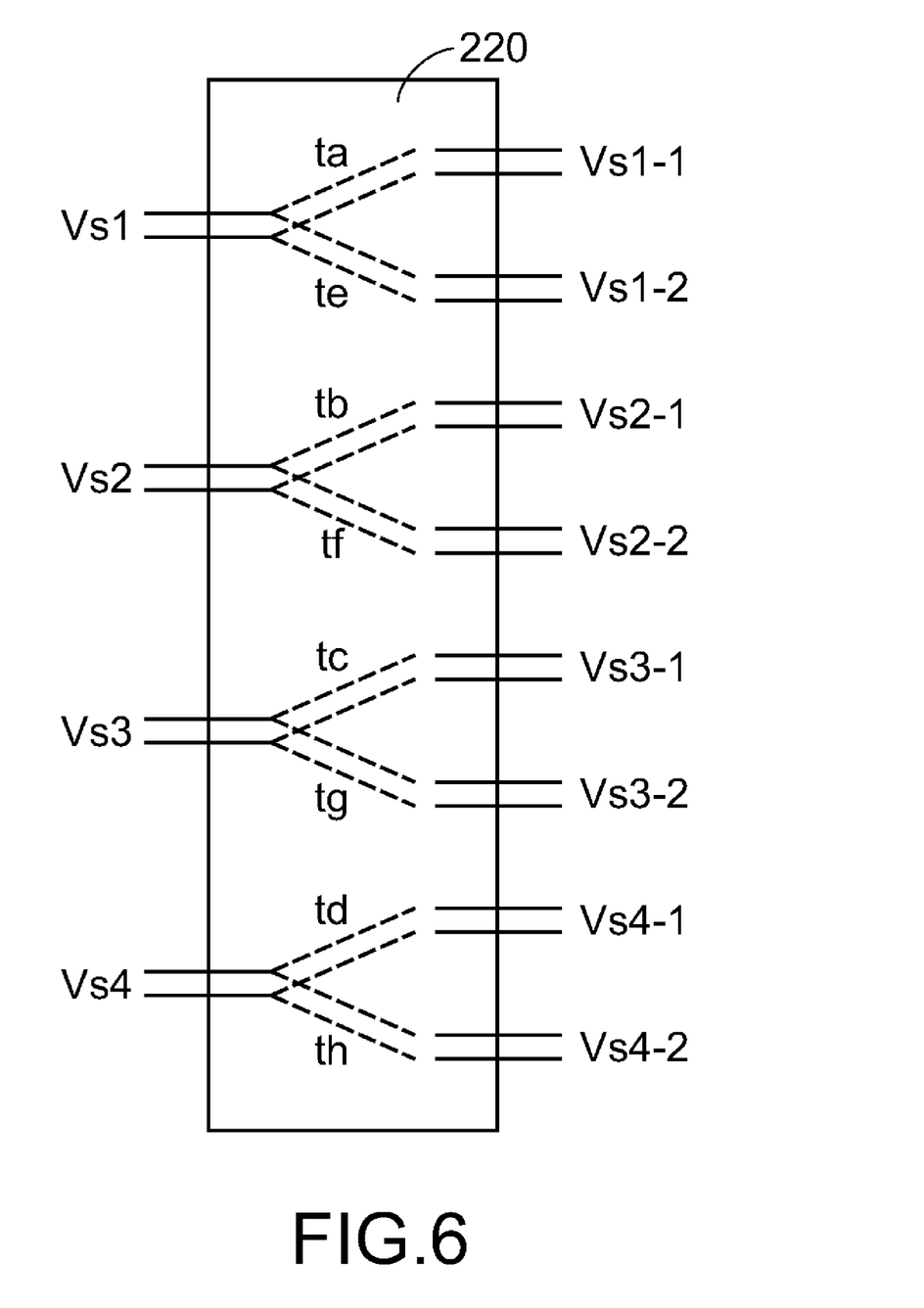
FIG. 6 is a schematic circuit block diagram illustrating an exemplary feedback signal switching circuit of the multi-phase voltage regulator shown in FIG. 3.

FIG. 6 is a schematic circuit block diagram illustrating an exemplary feedback signal switching circuit of the multi-phase voltage regulator shown in FIG. 3. For achieving normal operations of the feedback logic circuit 202 of the PWM control unit 200, the switches of the feedback signal switching circuit 220 are controlled in a time division multiplexing (TDM) manner. As a consequence, the sensing voltages are accurately received by the feedback logic circuit 202 of the PWM control unit 200 during the eight even time segments ta~th, thereby accurately adjusting the output currents flowing through the current providing paths 310~380. During the first time segment ta, the sensing voltage Vs1-1 is received by the input terminal of the sensing voltage Vs1 of the feedback logic circuit 202; during the second time segment tb, the sensing voltage Vs2-1 is received by the input terminal of the sensing voltage Vs2 of the feedback logic circuit 202; during the third time segment tc, the sensing voltage Vs3-1 is received by the input terminal of the sensing voltage Vs3 of the feedback logic circuit 202; and during the fourth time segment td, the sensing voltage Vs4-1 is received by the input terminal of the sensing voltage Vs4 of the feedback logic circuit 202. Similarly, during the fifth time segment te, the sensing voltage Vs1-2 is received by the input terminal of the sensing voltage Vs1 of the feedback logic circuit 202; during the sixth time segment tf, the sensing voltage Vs2-2 is received by the input terminal of the sensing voltage Vs2 of the feedback logic circuit 202; during the seventh time segment tg, the sensing voltage Vs3-2 is received by the input terminal of the sensing voltage Vs3 of the feedback logic circuit 202; and during the eighth time segment td, the sensing voltage Vs4-2 is received by the input terminal of the sensing voltage Vs4 of the feedback logic circuit 202.

From the above embodiments, it is found that the N counts of the pulse signals issued by the PWM control unit can be extended to M counts of pulse signals, wherein $M=N \times 2^K$, and K is a positive integer. Since the phase number is increased by means of the pulse signal extension circuit, the multi-phase voltage regulator of the present invention has many advantages, which will be described in more details as follows.

Generally, the relationship between the ripple current ($I_{ripple-current}$), the phase number n, a duty cycle D and the output current Io can be deduced by the following equation:

$$I_{ripple-current} = \frac{I_o}{n}\sqrt{nD(1-nD)}$$

wherein, $$D = \frac{V_{core}}{V_{in}}$$

Figure 7:
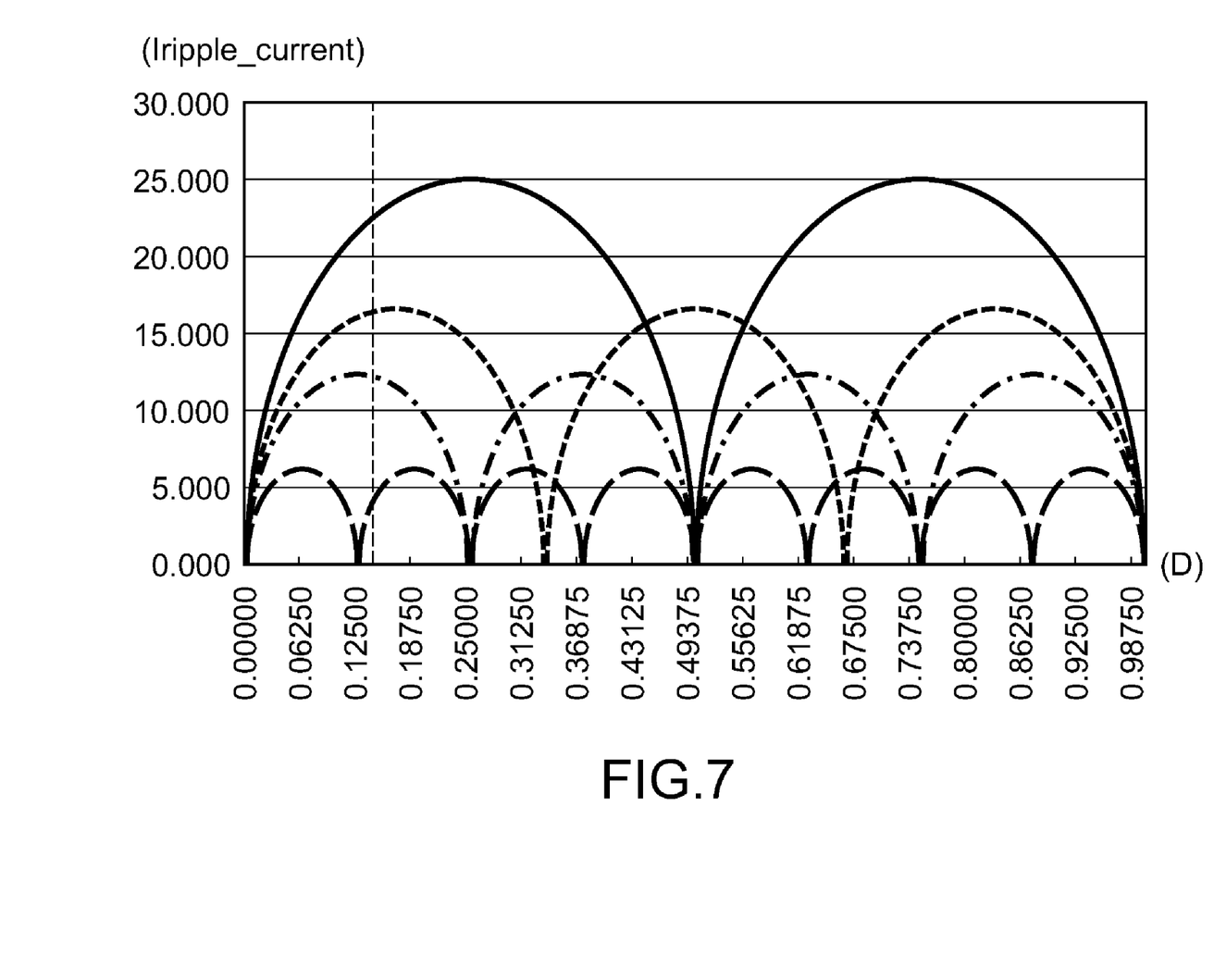
FIG. 7 is a schematic curve diagram illustrating the relation between the ripple current and the duty cycle for some multi-phase voltage regulators with different phase numbers, wherein the total magnitude of the all output currents is 100 A.

FIG. 7 is a schematic curve diagram illustrating the relation between the ripple current and the duty cycle for some multi-phase voltage regulators with different phase numbers, wherein the total magnitude of the all output currents is 100 A. In a case that the input voltage (Vin) is 12V and the core voltage (Vcore) is 1.3V, the duty cycle D=1.3/12=0.1083. According to the above equation, the ripple current is 22.63 A for a two-phase voltage regulator (n=2), 16.508 A for a three-phase voltage regulator (n=3), 12.359 A for a four-phase voltage regulator (n=4), 4.463 A for an eight-phase voltage regulator (n=8). That is, as the phase number of the multi-phase voltage regulator is increased, the ripple current is reduced.

Figure 8:
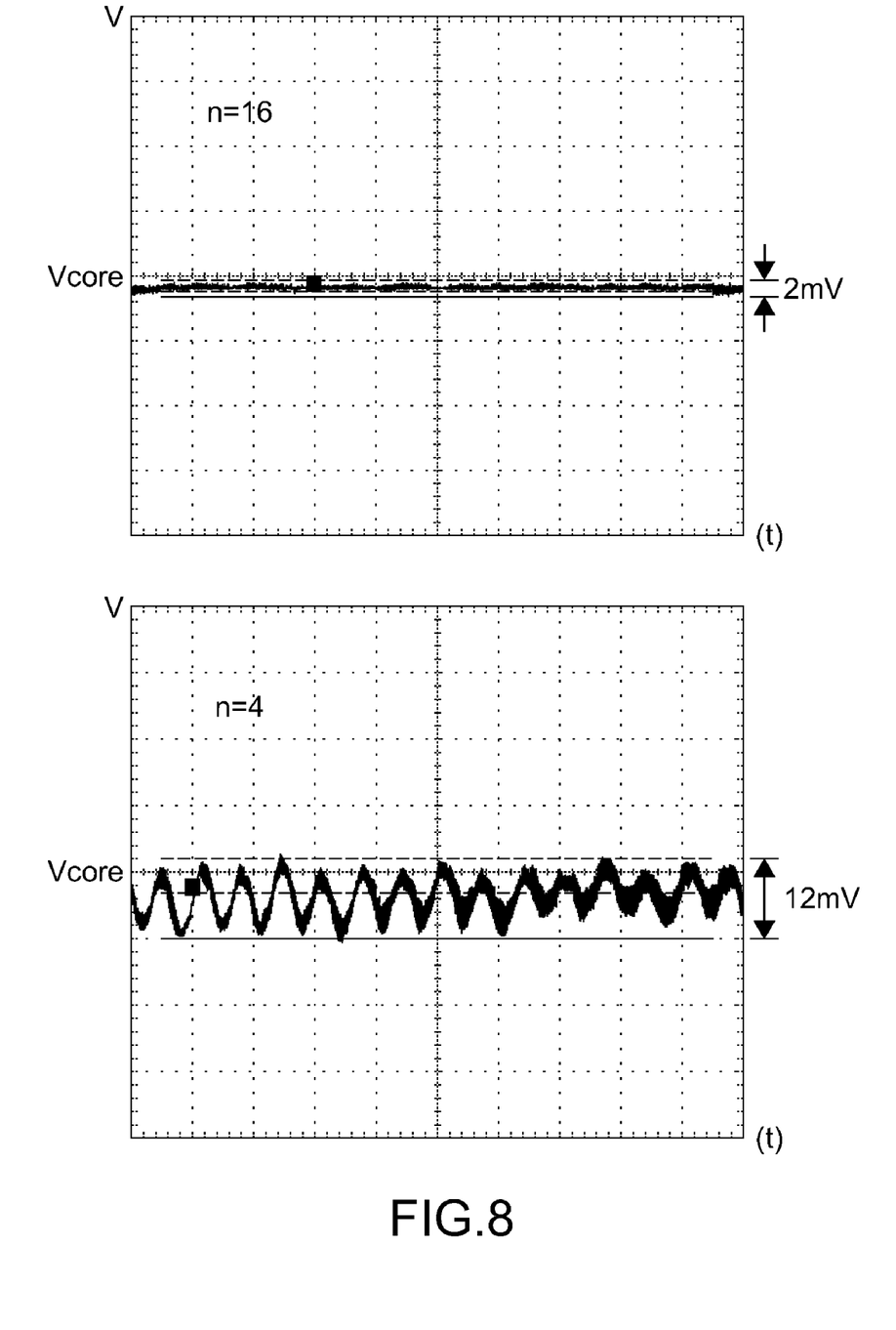
FIG. 8 schematically illustrates the comparison between the ripple voltage contained in the core voltage generated by a four-phase voltage regulator and the ripple voltage contained in the core voltage generated by a sixteen-phase voltage regulator.

FIG. 8 schematically illustrates the comparison between the ripple voltage contained in the core voltage generated by a four-phase voltage regulator and the ripple voltage contained in the core voltage generated by a sixteen-phase voltage regulator. As shown in FIG. 8, the ripple voltage contained in the core voltage generated by the four-phase voltage regulator (n=4) is about 12 mV; but the ripple voltage contained in the core voltage generated by the sixteen-phase voltage regulator (n=16). That is, as the phase number of the multi-phase voltage regulator is increased, the ripple voltage is reduced and thus the operation of the CUP is more stable.

Moreover, as the phase number of the multi-phase voltage regulator is increased, the output current flowing through each current providing path is reduced. Consequently, the electronic components of the current providing path needs not endure higher current or higher power. For example, the output current flowing through each current providing path of the eight-phase voltage regulator (n=8) is substantially 50% of that of the four-phase voltage regulator (n=4). In addition, the power consumed by the power transistor of the eight-phase voltage regulator (n=8) is 25% of that of the four-phase voltage regulator (n=4). In other words, as the phase number of the multi-phase voltage regulator is increased, the heat generated by the multi-phase voltage regulator is reduced and thus it becomes easier to control the temperature of the computer system.

Figure 9:
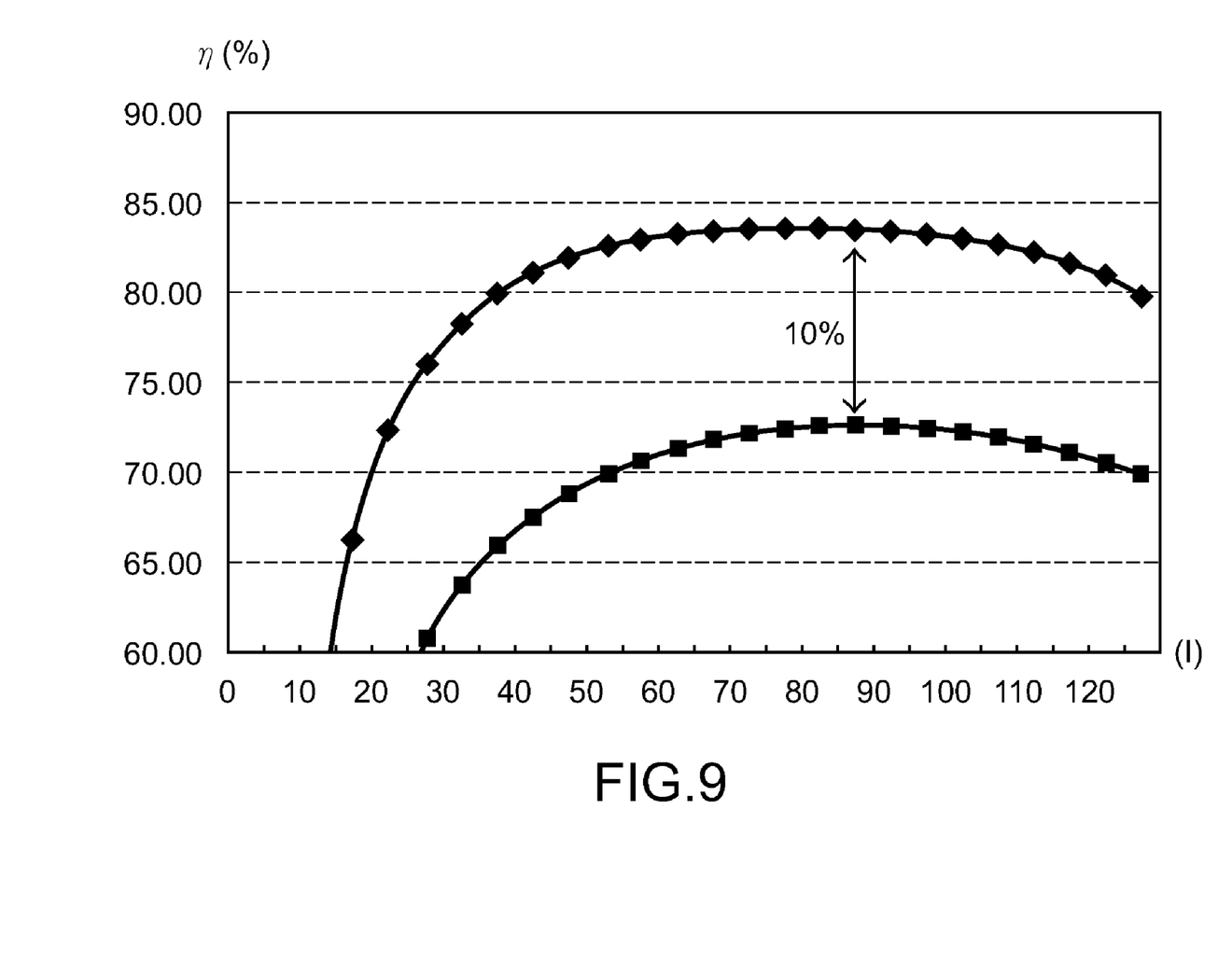
FIG. 9 is a schematic curve diagram illustrating the relation between the operating efficiency and the total output currents for a four-phase voltage regulator and an eight-phase voltage regulator.

FIG. 9 is a schematic curve diagram illustrating the relation between the operating efficiency and the total output currents for a four-phase voltage regulator and an eight-phase voltage regulator. As the phase number of the multi-phase voltage regulator is increased, the operating efficiency of the multi-phase voltage regulator is increased. In a case that the magnitude of the total output currents is 88 A, the operating efficiency of the four-phase voltage regulator is lower than the operating efficiency of the eight-phase voltage regulator by about 10%. Assuming the CPU consumes 130 Watt of power, the use of the eight-phase voltage regulator can save 13 Watt of power consumption.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-phase voltage regulator comprising:
    a pulse width modulation control unit for generating N counts of pulse signals in a first cycle period;
    a pulse signal extension circuit for receiving the N counts of pulse signals in a second cycle period and dividing the N counts of pulse signals into M counts of pulse signals, wherein $M=N\times 2^K$, K is a positive integer, and the second cycle period is $2^K$ times the first cycle period;
    M counts of current providing paths for generating corresponding M counts of sensing voltages in response to the M counts of pulse signals from the pulse signal extension circuit; and
    a feedback signal switching circuit for receiving the M counts of sensing voltages, successively switching the M counts of sensing voltages into N counts of sensing voltages, and transmitting the N counts of sensing voltages to the pulse width modulation control unit.

2. The multi-phase voltage regulator according to claim 1 wherein the pulse width modulation control unit further comprises a feedback logic circuit for receiving the N counts of sensing voltages that is transmitted from the feedback signal switching circuit, thereby adjusting the pulse widths of the N counts of sensing voltages.

3. The multi-phase voltage regulator according to claim 1 wherein the pulse signal extension circuit comprises N sets of extension units, and each set of extension unit comprises:
    a NOT gate has an input terminal receiving a specified pulse signal of the N counts of pulse signals;
    a D flip flop having a clock input terminal, a data input terminal, an inverse output terminal and a positive output terminal, wherein the clock input terminal is connected to an output terminal of the NOT gate, and the data input terminal and inverse output terminal are connected with each other;
    a first AND gate having a first input terminal connected to the inverse output terminal of the D flip flop and a second input terminal receiving the specified pulse signal, thereby outputting one pulse signal of the M counts of pulse signals; and
    a second AND gate having a first input terminal connected to the positive output terminal of the D flip flop and a second input terminal receiving the specified pulse signal, thereby outputting another pulse signal of the M counts of pulse signals.

4. The multi-phase voltage regulator according to claim 1 wherein each of the current providing paths comprises:
    a driver unit for generating a first driving signal and a second driving signal in receipt of one of the M counts of pulse signals; and
    a power stage circuit for generating an output current and one of the M counts of sensing voltages in receipt of the first driving signal and the second driving signal.

5. The multi-phase voltage regulator according to claim 4 wherein the driver unit of the current providing path comprises:
    a steering logic circuit for generating a first steering signal and a second steering signal in receipt of one of the M counts of pulse signals;
    a first driving circuit for generating the first driving signal in response to the first steering signal; and
    a second driving circuit for generating the second driving signal in response to the second steering signal.

6. The multi-phase voltage regulator according to claim 4 wherein the power stage circuit of the current providing path comprises:
    an upper power transistor having a drain electrode connected to a supply voltage and a gate electrode receiving the first driving signal;
    a lower power transistor having a source electrode connected to a ground terminal and a gate electrode receiving the second driving signal;
    an output inductor having a first terminal connected to a source electrode of the upper power transistor and a drain electrode of the lower power transistor;
    a current sense resistor interconnected between a second terminal of the output inductor and an output terminal of the power stage circuit; and
    an output capacitor interconnected between the output terminal of the power stage circuit and the ground terminal.

7. The multi-phase voltage regulator according to claim 6 wherein the output terminal of the power stage circuit is connected to a power layer of a motherboard such that the output current is transmitted to a central processing unit on the motherboard through the power layer.

8. The multi-phase voltage regulator according to claim 6 wherein a potential difference across both ends of the current sense resistor is equal to a corresponding sensing voltage of the M counts of sensing voltages.

9. A motherboard comprising:
    a pulse width modulation control unit for generating N counts of pulse signals in a first cycle period;
    a pulse signal extension circuit for receiving the N counts of pulse signals in a second cycle period and dividing the N counts of pulse signals into M counts of pulse signals, wherein $M=N\times 2^K$, K is a positive integer, and the second cycle period is $2^K$ times the first cycle period;
    M counts of current providing paths for generating corresponding M counts of output currents and corresponding M counts of sensing voltages in response to the M counts of pulse signals from the pulse signal extension circuit;
    a feedback signal switching circuit for successively switching the M counts of sensing voltages into N counts of sensing voltages;
    a power layer connected to the M counts of current providing paths for receiving the M counts of output currents, thereby providing a core voltage; and
    a central processing unit for receiving the core voltage.

10. The motherboard according to claim 9 wherein the pulse signal extension circuit comprises N sets of extension units, and each set of extension unit comprises:
    a NOT gate has an input terminal receiving a specified pulse signal of the N counts of pulse signals;
    a D flip flop having a clock input terminal, a data input terminal, an inverse output terminal and a positive output terminal, wherein the clock input terminal is connected to an output terminal of the NOT gate, and the data input terminal and inverse output terminal are connected with each other;
    a first AND gate having a first input terminal connected to the inverse output terminal of the D flip flop and a second input terminal receiving the specified pulse signal, thereby outputting one pulse signal of the M counts of pulse signals; and
    a second AND gate having a first input terminal connected to the positive output terminal of the D flip flop and a second input terminal receiving the specified pulse signal, thereby outputting another pulse signal of the M counts of pulse signals.

11. The motherboard according to claim 9 wherein each of the current providing paths comprises:
   a driver unit for generating a first driving signal and a second driving signal in receipt of one of the M counts of pulse signals; and
   a power stage circuit for generating an output current and one of the M counts of sensing voltages in receipt of the first driving signal and the second driving signal.

12. The motherboard according to claim 11 wherein the driver unit of the current providing path comprises: a steering logic circuit for generating a first steering signal and a second steering signal in receipt of one of the M counts of pulse signals; a first driving circuit for generating the first driving signal in response to the first steering signal; and a second driving circuit for generating the second driving signal in response to the second steering signal.

13. The motherboard according to claim 11 wherein the power stage circuit of the current providing path comprises:
   an upper power transistor having a drain electrode connected to a supply voltage and a gate electrode receiving the first driving signal;
   a lower power transistor having a source electrode connected to a ground terminal and a gate electrode receiving the second driving signal;
   an output inductor having a first terminal connected to a source electrode of the upper power transistor and a drain electrode of the lower power transistor;
   a current sense resistor interconnected between a second terminal of the output inductor and an output terminal of the power stage circuit; and
   an output capacitor interconnected between the output terminal of the power stage circuit and the ground terminal.

14. The motherboard according to claim 13 wherein a potential difference across both ends of the current sense resistor is equal to a corresponding sensing voltage of the M counts of sensing voltages.

15. The motherboard according to claim 9 wherein the pulse width modulation control unit further comprises a feedback logic circuit for receiving the N counts of sensing voltages that is transmitted from the feedback signal switching circuit, thereby adjusting the pulse widths of the N counts of sensing voltages.

* * * * *